United States Patent

[11] 3,629,848

[72] Inventors Robert G. Gibson
Binghamton;
Allan Greenberg, Poughkeepsie; John D. Wilcox, Owego, all of N.Y.

[21] Appl. No. 73,918
[22] Filed Sept. 21, 1970
[45] Patented Dec. 21, 1971
[73] Assignee International Business Machines Corporation
Armonk, N.Y.

[54] PRINT COMPARE OPERATION FROM MAIN STORAGE
5 Claims, 3 Drawing Figs.

[52] U.S. Cl. .......... 340/172.5, 101/93 C
[51] Int. Cl. .......... G11c 7/00
[50] Field of Search .......... 340/172.5; 101/93

[56] References Cited

UNITED STATES PATENTS

| | | | |
|---|---|---|---|
| 3,193,802 | 7/1965 | Deerfield .......... | 340/172.5 |
| 3,240,920 | 3/1966 | Barbagallo et al. .......... | 340/172.5 X |
| 3,323,110 | 5/1967 | Oliari et al. .......... | 340/172.5 |
| 3,453,600 | 7/1969 | Stafford et al. .......... | 340/172.5 |
| 3,500,466 | 3/1970 | Carleton .......... | 340/172.5 |

*Primary Examiner*—Gareth D. Shaw
*Assistant Examiner*—Paul R. Woods
*Attorney*—Sughrue, Rothwell, Mion, Zinn & Macpeak

ABSTRACT: An adapter for controlling the operation of chain/train printers employs the main storage of a central processing unit to store characters to be printed and an image of the chain. Two hardware address registers are provided to read out or load the contents of the two storage areas. One register is used to address the character to be printed in the print line area. The second register addresses the character properly aligned with the print position to be printed. The two characters are read out of storage sequentially via a "cycle steal" technique. Upon acceptance of a cycle steal request, the contents of the first address register is entered into the storage address register, and the proper chain character is read out into the cycle steal register and then transferred to the universal character set register. A second cycle steal is begun by presenting the contents of the second address register to the storage address register. The proper print line character is then read out into the cycle steal register. The two characters are then compared to determine if a print hammer is to be fired.

INVENTORS
ROBERT G. GIBSON
ALAN GREENBERG
JOHN D. WILCOX

BY
Sughrue, Rothwell, Mion, Zinn & Macpeak
ATTORNEYS

PRINT COMPARE OPERATION FROM MAIN STORAGE

BACKGROUND OF THE INVENTION

1. Field of the Invention

The present invention generally relates to printer control systems, and more particularly to a system for controlling chain/train printers wherein a print compare for comparing a character on the chain and the character to be printed in a given position is made by a cycle steal operation from main storage of a central processing unit by way of a print line address register and a universal character set address register instead of the usual compare between a separate printline buffer and a universal character set buffer or a print character generator counter.

2. Description of the Prior Art

The print operation of the chain/train printers requires a comparison of the character lined up on the chain mechanism with the character to be printed at a particular position. The standard approach to this function is to maintain the characters to be printed in a unique buffer called the printline buffer. The unit that is utilized to remember what character is lined up at a particular print position on the chain at any given moment is called the print character generator. More recently, a unique buffer, separate from the printline buffer, called the universal character set buffer has been employed to store the chain image, and a counter maintained in synchronism with the chain is used to address this buffer. Hence, at any particular time the chain character lined up with a print position may be recalled from the universal character set buffer.

While the conventional approach to the print compare operation in chain/train printers has performed satisfactorily in the past, each printer requires two separate buffers or a printline buffer and a print character generator counter. This is a significant amount of hardware that must be duplicated for each printer in a multiple printer attachment to central processing units.

SUMMARY OF THE INVENTION

It is therefore an object of the present invention to provide a chain/train printer control system that eliminates the need for separate printline and universal character set buffers.

It is another object of this invention to provide a printer control system in which a print compare operation for comparing a character on the chain and the character to be printed is made by a cycle steal operation from main storage.

According to the present invention, the foregoing and other objects are attained by assigning two areas in the main storage of a central processing unit to store the characters to be printed and the image of the chain, respectively. Thus, these two areas in the main storage replace the printline and universal character set buffers. Two hardware address registers, the printline address register and the universal character set address register, are provided to read out or load the contents of these respective storage registers. The two characters are read out of storage sequentially via a cycle steal technique. This technique allows access to storage data without disturbing the proper operation of the systems function. A control line is raised to the system requesting a storage-stealing cycle. Upon acceptance of this cycle steal request, the contents of the universal character set address register are entered into the storage address register assembler and thence into the storage address register. The proper chain character is then read out thru the cycle steal register into the universal character set register and regenerated. The second cycle steal is begun by presenting the contents of the printline address register to the storage address register assembler and thence into the storage address register. The printline character is then read out into the cycle steal register. At this point, the characters in the universal character set register and cycle steal register are compared directly to determine if a print hammer is to be fired.

Thus, no separate buffers are needed to perform the print compare operation. Also, through the cycle steal approach, this function is performed without interfering with the system in which the storage is incorporated. By adding an additional set of printline address and universal character set address registers and assigning other buffer areas within the main storage, it is possible to add a second printer to the system. With the increase in operating speed of main storages, this method of printer attachment to central processing units becomes increasingly attractive.

BRIEF DESCRIPTION OF THE DRAWINGS

The specific nature of the invention, as well as other objects, aspects, uses and advantages thereof, will clearly appear from the following description and from the accompanying drawings, in which.

DESCRIPTION OF THE PREFERRED EMBODIMENT

Figure 1:
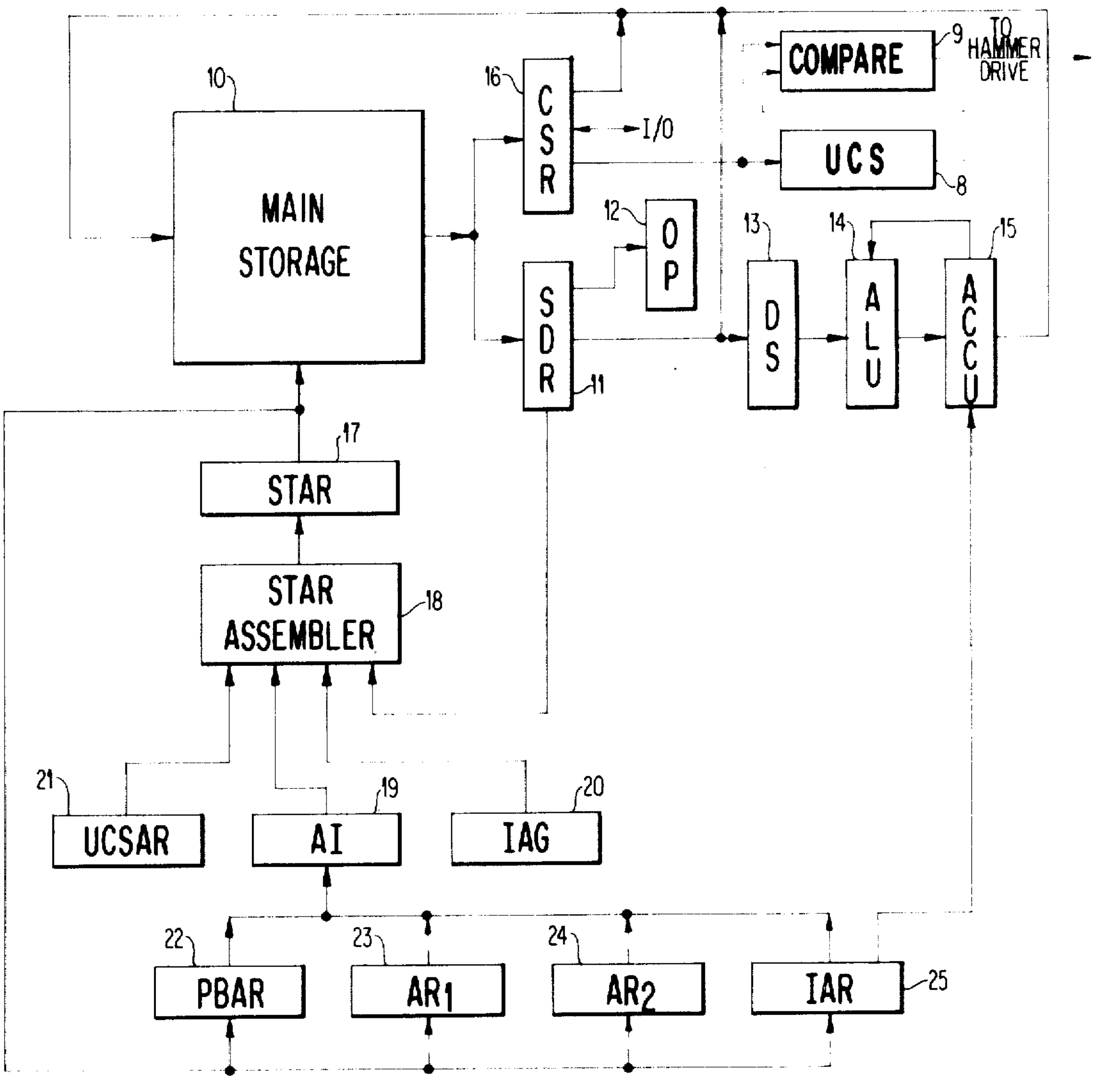
FIG. 1 is a block diagram representing a typical data flow for a small central processing unit and its main storage unit illustrating how a preferred embodiment of the invention operates.

Referring now to the drawings wherein like reference numerals designate identical or corresponding parts throughout the several Figures, and more particularly to FIG. 1, the main storage unit 10 of the central processing unit may be, for example, a core storage unit consisting of 4,000 half words of read/write storage. A half word is defined as 18 bits. The 18 bits can be used to store a machine instruction or 2 bytes of data. Each byte consists of eight data bits plus a parity bit.

As illustrated at the top of the diagram, data or instructions are read out of main storage 10 into the storage data register 11 which is a memory output register. If the machine is in an instruction cycle, the operation code is put into the operation register 12 and then decoded (not shown) to control machine functions. The other path from the storage data register 11 is a path through the data storage register 13, the arithmetic and logic unit 14, and the accumulator 15 back into main storage 10. It is through this path that data and operands can be acted on with logical and arithmetic functions and then stored back into main storage.

Data can also be read out of main storage into the cycle steal register 16. The line drawn from the cycle steal register with arrows in both directions and labeled I/O indicates the path that data takes to and from the input/output adapters of the machine. The cycle steal operation is disclosed in greater detail in U.S. Pat. No. 3,453,600 issued July 1, 1969, to Thomas S. Stafford and Matthew A. Krygowski for "Program Suspension System." In the case of the instant invention, the cycle steal operation is also employed to perform the print compare and synchronization functions with the main storage. This is accomplished by reading out into the cycle steal register 16 the proper chain character during a first cycle steal, and then transferring the chain character to the universal character set register 8. The proper printline character is read out into the cycle steal register 16 during a second cycle steal. The contents of the universal character set register 8 and the cycle steal register are then compared in compare circuit 9. If the comparison is true, the print hammer is fired; otherwise, the process is repeated.

The registers shown at the bottom of the diagram represent the storage-addressing paths. The storage address register 17 is controlled by the storage address register assembler 18 and actually addresses the main storage 10 and causes the storage location represented by its bit pattern to be accessed. Various counter and registers can feed addresses into the assembler 18 to gain access to positions of main storage 10. These include the address incrementer 19 which is used to increment or decrement addresses being entered into the storage address register, depending on the operation being performed. The instruction address generator 20 is used to generate a fixed address into the storage address register. While neither the address incrementer 19 or the instruction address generator 20 are themselves a part of the present invention, they help to illustrate the data flow in a typical central processing unit and thereby serve to show how the preferred embodiment of the invention works.

Both the universal character set address register 21 and the print buffer address register 22 are, however, a part of the present invention. The universal character set address register 21 feeds address to the storage address register 17 by way of assembler 18. The print buffer address register 22 provides an output to the address incrementer and receives an input from the storage address register 17. Registers 21 and 22 are described in more detail with reference to FIG. 2, below.

Address registers 23 and 24 merely represent additional registers which can be added to the data flow to control other I/O devices such as card readers and punches in a cycle steal mode. The instruction address register 25 is used to store the address being executed while other registers are being gated into the storage address register. This is especially true during a cycle steal mode using the universal character set address register 21 or the print buffer address register 22, as will become more apparent from the following discussion.

Figure 3:
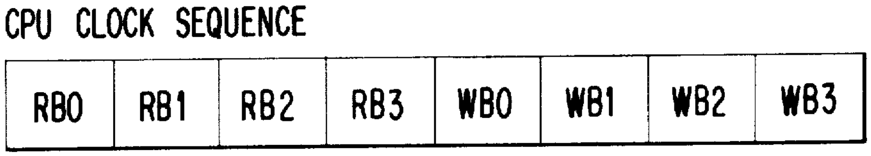
FIG. 3 is a simplified timing diagram illustrating a typical central processing unit clock sequence.
Figure 2:
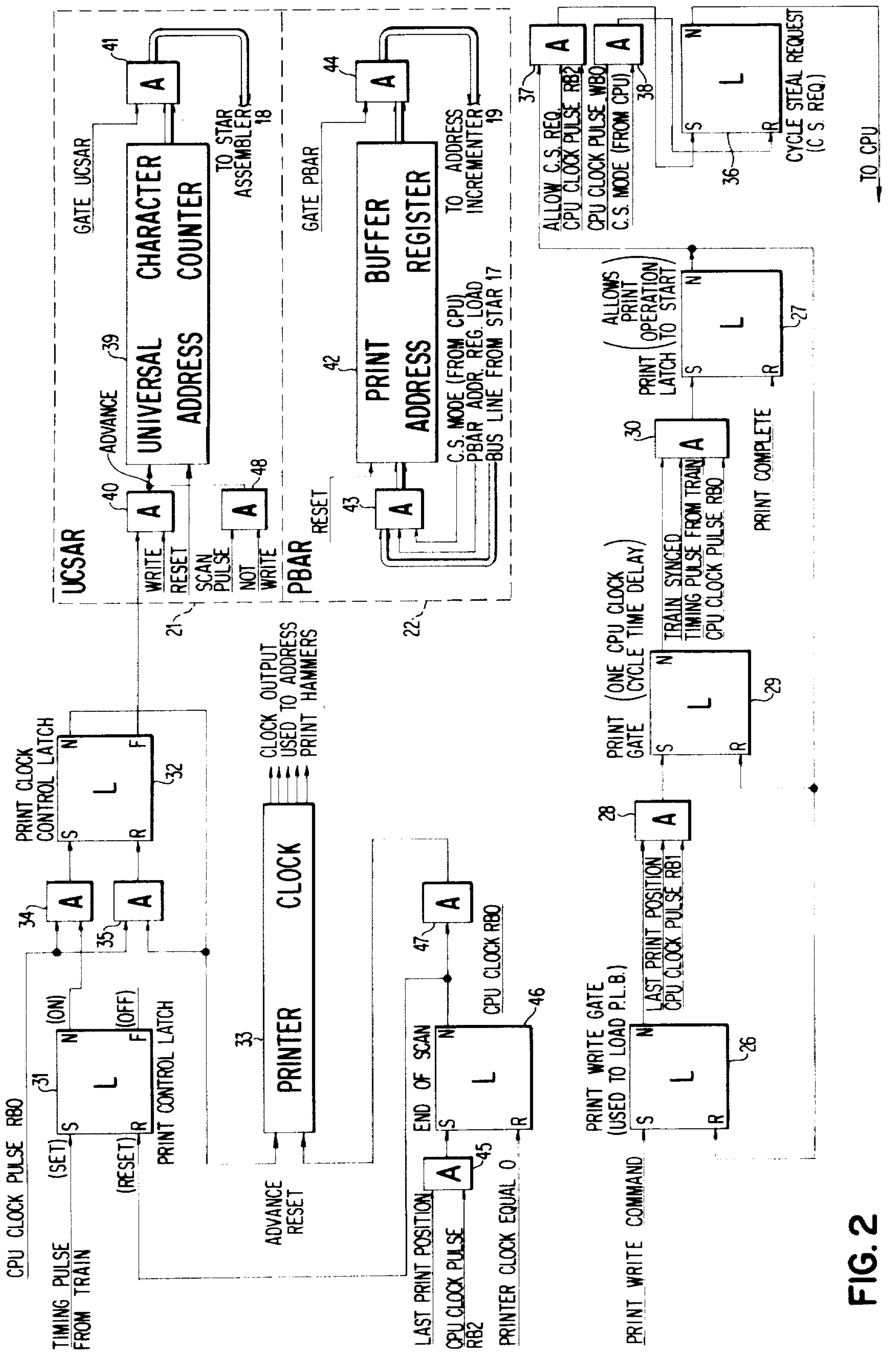
FIG. 2 is a logic diagram of the circuitry which enables a chain/train printer to be operated in synchronism with the main storage of a central processing unit according to a preferred embodiment of the invention.

FIG. 2 is a diagram of the print synchronization logic according to the invention. The following description is in the sequence of events that take place. The print write gate latch 26 is set by decoding of a valid print command which is sent from the central processing unit. It is reset when the print latch 27 is set indicating the print buffer in main storage 10 is full or the entire line has been transferred and actual printing may start. The output of the print write gate 26 is ANDed with the "last" print position and CPU clock pulse RB1 in AND-gate 28 to set the print gate latch 29. The sequence of CPU clock phases is shown in FIG. 3, and reference should be made to this figure for an understanding of this invention. Print gate latch 29 is used to gate the set of print latch 27. This is accomplished by AND-gate 30 which receives as inputs the gate pulse from latch 29, CPU clock pulse RBO, train synced pulse and a timing pulse from the print train. The setting of the print latch 27 is controlled to start the actual print operation when the next character on the train is aligned with print position number one. The train, which is continually running, emits timing pulses called scan pulses everytime a new character is aligned with print position one. In this mode of operation, printing starts when the next character is aligned with print position one after the print buffer is filled. Print gate latch 29 is also reset when print latch 27 is set.

The scan pulse also sets the print control latch 31, which in turn controls a latch 32 called the print clock control latch. Latch 32 is really the first position of a binary ring counter 33 called the printer clock. As shown, the print clock control latch 32 is alternately set and reset by CPU clock pulse RBO connected to AND-gates 34 and 35. AND-gate 34 is connected to the set input of latch 32 and gated by the "on" output of latch 31. AND-gate 35 is connected to reset input of latch 32 and gated by the "on" output of the same latch. Thus, when print control latch 31 is reset, print clock control latch 32 will be reset by the next CPU clock pulse RBO or remain reset, depending on its state, and will not be set again until such time that latch 31 is again set. Printer clock 33 is used to maintain synchronization with the print train during a print scan as there are no subscan timing pulses provided by the train. It is also used to address the particular print hammer optioned as well as general control.

The structure described up to this point synchronizes the printer functions with the train as well as with the CPU clock. To review the sequence, first the print write gate 26 is set by a print command sent by the central processing unit. When a scan pulse is emitted by the print train, the print latch 27 is set, at which time synchronization occurs and printing starts. At this point, the printer function is ready to start.

The cycle steal request latch 36 is set by ANDing the output of print latch 27, CPU clock pulse RB2, and a signal from the central processing unit that a cycle steal request is permissible at that time. This is accomplished by AND-gate 37 connected to the set input of latch 36. Cycle steal request latch 36, when set, requests the central processing unit for permission to steal a main memory cycle in which case a byte of data is obtained from the print buffer portion of the main storage 10. Cycle steal latch 36 is reset by ANDing CPU clock pulse WBO and a signal called cycle steal mode from the central processing unit in AND-gate 38. Resetting of latch 36 amounts to a communication from the central processing unit permitting the logic circuitry according to the invention to steal a cycle. As shown in FIG. 2, when this happens, the universal character set address register 21 is gated to the storage address register 17 of the central processing unit, and that byte of data is then read out of the main storage 10 thru the cycle steal register 16 into the universal character set register 8.

As shown in FIG. 2, the universal character set address register 21 comprises an address counter 39. This counter is incremented by the output of AND-gate 40 which gates write pulses under control of the print clock control latch 32. At the beginning of a printing operation, counter 39 is reset to an initial address corresponding to the first address in that section of the main storage 10. The address in counter 39 is gated out in parallel in response to a gate signal from the central processing unit. This gating function is shown symbolically by a single AND-gate 41. During nonprinting operations, it is necessary to maintain the universal character set address register in synchronism with the print train. This is accomplished by incrementing counter 39 by the output of AND-gate 48 which gates scan pulses from the train with a not write signal.

After the contents of counter 39 have been gated to the storage address register 17, an additional cycle steal request occurs at which time the print buffer address register 22 is transferred to the address incrementer 19 and then to the storage address register 17 by way of assembler 18. As shown more particularly in FIG. 2, print buffer address register 22 comprises a register 42 which is loaded in parallel and read out in parallel. AND-gate 43 symbolically represents the input to register 42 and gates the bus line from the storage address register 17 by means of two control signals from the central processing unit. These two control signals are a cycle steal mode signal and a print buffer address register load signal. AND-gate 44 symbolically gates the output of register 42 to address incrementer 19 under control of a signal from the central processing unit. When this occurs the corresponding data is transferred out of main storage 10 as before, but this time it is compared directly with the previous byte now stored in the universal character set register 8. This compare function is performed by compare circuit 9 but alternatively may be performed by the arithmetic and logic unit 14 of the central processing unit. The print buffer address register is reset to a predetermined address after a print operation has been completed. This predetermined address is the address in main storage of the first position of the "print buffer" in main storage 10.

At this point, it is appropriate to discuss in more detail the print compare operation. What needs to be done is to compare at a given point in time the character aligned at a print position on the mechanical train with the character stored in the print buffer which is to be printed at that location. In order to do the comparison electronically, an image of the characters as they are arranged on the train is stored in the universal character set buffer section of main storage 10. The universal character address counter 39, which is part of the printer adapter according to the invention, is continually kept in synchronism with the mechanical train by using scan pulses to advance the counter each time a scan pulse is received from the train when no printing is actually occurring. When printing is taking place, it is started with a new scan pulse, and then the printer clock is used to advance counter 39 at the same rate at which characters are being aligned at various print positions. In this manner, counter 39 can be used to address main storage 10, and the character read out will correspond to the character on the train which is being aligned at the print position selected by the printer clock. For example, if an "A" is stored in print buffer position one, and the counter 39 addresses the universal character set buffer portion of main storage 10 to read out an "A," then there will be an "A" in the cycle steal register 16 and an "A" in the storage data register 11. Since both registers contain the same bit pattern, the compare circuitry recognizes this and causes the printer hammer associated with print position one to be fired, thus impacting the ribbon and paper into the train causing an "A" to be printed. In the event the two characters in the registers 11 and 16 do not compare, the registers 21 and 22 are updated, and the above operation continued until a complete printline has been completed.

After all print hammers have been fired and reset, a print complete signal is generated to reset print latch 27 thereby preventing further cycle steal requests until a new print operation is initiated by a print write command. At the end of a printing operation, a last print position signal gates CPU clock pulse RB2 in AND-gate 45. The output of AND-gate 45 sets end of scan latch 46 which resets the print control latch 31. The output of latch 46 also gates CPU clock pulse RBO in AND-gate 47 to reset printer clock 33. Latch 46 is itself reset when the printer clock is reset to zero.

We claim:

1. A printer adapter for controlling the operation of chain/train printers wherein two areas in the main storage of a central processing unit are assigned to store the characters to be printed and an image of the printer chain, said central processing unit including a storage address register for addressing data stored in said main storage, a universal character set register for receiving data read out of said main storage, and a cycle steal register also for receiving data read out of said main storage, said printer adapter comprising:

a. first and second address registers for addressing said two areas of said main storage, b. cycle steal means for sequentially gating the contents of said first and second address registers into said storage address register thereby causing data stored in said two areas of said main storage to be read out into said universal character set register and said cycle steal register, and c. comparing means for comparing the bit patterns in said universal character set register and said cycle steal register.

2. A printer adapter as recited in claim 1 wherein one of said first and second address registers includes a counter which is advanced in synchronism with the printer chain and the contents of said counter are used to address that area of the main storage in which the image of the printer chain is stored.

3. A printer adapter as recited in claim 2 wherein said central processing unit further includes an address incrementer for incrementing addresses entered into said storage address register and the other end of said first and second address registers is connected to said address incrementer and the contents thereof used to address that area of the main storage in which the characters to be printed are stored.

4. A printer adapter as recited in claim 3 wherein the input to said other one of said first and second address registers is connected to the output bus from said storage address register.

5. A printer adapter as recited in claim 1 wherein said cycle steal means comprises:

a. a cycle steal request latch which when set requests the central processing unit for permission to steal a main memory cycle, said cycle steal latch being reset by said central processing unit to initiate a print compare operation from main storage, and b. means response to the decoding of a valid print command for setting said cycle steal request latch.

* * * * *

PO-1050
(5/69)

UNITED STATES PATENT OFFICE
CERTIFICATE OF CORRECTION

Patent No. 3,629,848 Dated December 21, 1971

Inventor(s) Robert G. Gibson, Allan Greenberg and John D. Wilcox

It is certified that error appears in the above-identified patent and that said Letters Patent are hereby corrected as shown below:

Claim 3, Column 6, line 19, after "other" the word "end" should read --one--. Claim 5, Column 6, line 34, after "means" the word "response" should read --responsive--.

Signed and sealed this 26th day of September 1972.

(SEAL)
Attest:

EDWARD M.FLETCHER,JR.
Attesting Officer

ROBERT GOTTSCHALK
Commissioner of Patents